(12) United States Patent
Yuruzume

(10) Patent No.: US 11,237,786 B2
(45) Date of Patent: Feb. 1, 2022

(54) IMAGE FORMING APPARATUS, IMAGE FORMING SYSTEM, AND METHOD OF CONTROLLING IMAGE FORMING APPARATUS

(71) Applicant: TOSHIBA TEC KABUSHIKI KAISHA, Tokyo (JP)

(72) Inventor: Satoshi Yuruzume, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/905,585

(22) Filed: Jun. 18, 2020

(65) Prior Publication Data

US 2021/0064314 A1    Mar. 4, 2021

(30) Foreign Application Priority Data

Aug. 26, 2019    (JP) .............................. JP2019-154084

(51) Int. Cl.
*G06F 3/12*    (2006.01)

(52) U.S. Cl.
CPC .......... *G06F 3/1261* (2013.01); *G06F 3/1204* (2013.01); *G06F 3/1222* (2013.01); *G06F 3/1238* (2013.01); *G06F 3/1255* (2013.01)

(58) Field of Classification Search
None
See application file for complete search history.

(56) References Cited

U.S. PATENT DOCUMENTS

| 5,287,194 | A | 2/1994 | Lobiondo | |
|---|---|---|---|---|
| 2002/0016833 | A1* | 2/2002 | Yajima | H04N 1/00233 709/220 |
| 2008/0192289 | A1* | 8/2008 | Honda | H04N 1/444 358/1.15 |
| 2011/0137778 | A1* | 6/2011 | Kurihara | G06Q 30/04 705/34 |
| 2011/0242557 | A1* | 10/2011 | Sato | G06F 3/1288 358/1.9 |

FOREIGN PATENT DOCUMENTS

| JP | 2000215014 A | 8/2000 |
|---|---|---|
| JP | 2001096855 A | 4/2001 |
| JP | 2001142663 A | 5/2001 |
| JP | 2017080984 A | 5/2017 |

OTHER PUBLICATIONS

Extended European Search Report dated Jan. 25, 2021, mailed in counterpart European Application No. 20187127.4, 8 pages.

* cited by examiner

*Primary Examiner* — Frantz Bataille
(74) *Attorney, Agent, or Firm* — Kim & Stewart LLP

(57) ABSTRACT

According to one or more embodiments, an image forming apparatus comprises a communication interface, an image forming unit, and a processor. The communication interface communicates with a plurality of information processing apparatuses via a network and receives print jobs from the information processing apparatuses. The image forming unit executes printing according to a first print job. The processor determines a presence of a user associated with a second print job near the image forming apparatus, and then determines, based on the presence of the user, whether to execute the first print job or to transmit or forward the first print job to another image forming apparatus.

20 Claims, 4 Drawing Sheets

FIG. 3

Already received print job:

| User ID | Computer name | Job name | Creation date and time | Number of prints (sheet) | Expected process time (second) |
|---|---|---|---|---|---|
| 0002 | ABC | File A.doc | 2019/5/5 16:00 | 120 | 60 |
| 0003 | DEF | File B.doc | 2019/5/5 16:07 | 40 | 20 |
| 0003 | GHI | File C.doc | 2019/5/5 16:10 | 30 | 15 |

Newly received print job:

| User ID | Computer name | Job name | Creation date and time | Number of prints (sheet) | Expected process time (second) |
|---|---|---|---|---|---|
| 0001 | JKL | File D.doc | 2019/5/5 16:15 | 21 | — |

IMAGE FORMING APPARATUS, IMAGE FORMING SYSTEM, AND METHOD OF CONTROLLING IMAGE FORMING APPARATUS

This application is based upon and claims the benefit of priority from Japanese Patent Application No. 2019-154084, filed on Aug. 26, 2019, the entire contents of which are incorporated herein by reference.

FIELD

Embodiments described herein relate generally to an image forming apparatus, an image forming system, and a method of controlling an image forming apparatus.

BACKGROUND

There is an image forming apparatus that executes printing based on print jobs supplied from various clients such as a PC, a smart phone, a tablet, and the like. In addition, there is a configuration in which a plurality of image forming apparatuses and a plurality of clients are connected via a network. In such a case, each client selects one of the image forming apparatuses and transmits a print job to the selected image forming apparatus. The selected image forming apparatus performs authentication using an integrated circuit (IC) card or a portable terminal, such as a smartphone, possessed by a user corresponding to the client supplying the print job and then executes the printing based on the received print job when the authentication is successful.

However, if a user (User A) sends a print job to an image forming apparatus that another user (User B) is already using for a print job, User A cannot print with that image forming apparatus until User B's printing is complete.

BRIEF DESCRIPTION OF THE DRAWINGS

FIG. 3 depicts an example of a print job list in an image forming apparatus according to an embodiment.

DETAILED DESCRIPTION

According to one or more embodiments, an image forming apparatus comprises a communication interface, an image forming unit, and a processor. The communication interface is configured to communicate with a plurality of information processing apparatuses via a network and receive a plurality of print jobs from the information processing apparatuses. The image forming unit is configured to execute a first print job of the plurality of print jobs. The processor is configured to determine a presence of a user corresponding to a second print job in the vicinity of the image forming apparatus. The second print job is a print job that has been received before the first print job. Then, based on the presence of the user associated with the second print job, the processor is configured to determine whether to execute t the first print job or to transmit the first print job to another image forming apparatus.

Hereinafter, embodiments of an image forming apparatus, an image forming system, and a method for controlling the image forming apparatus will be described with reference to the accompanying drawings.

Figure 1:
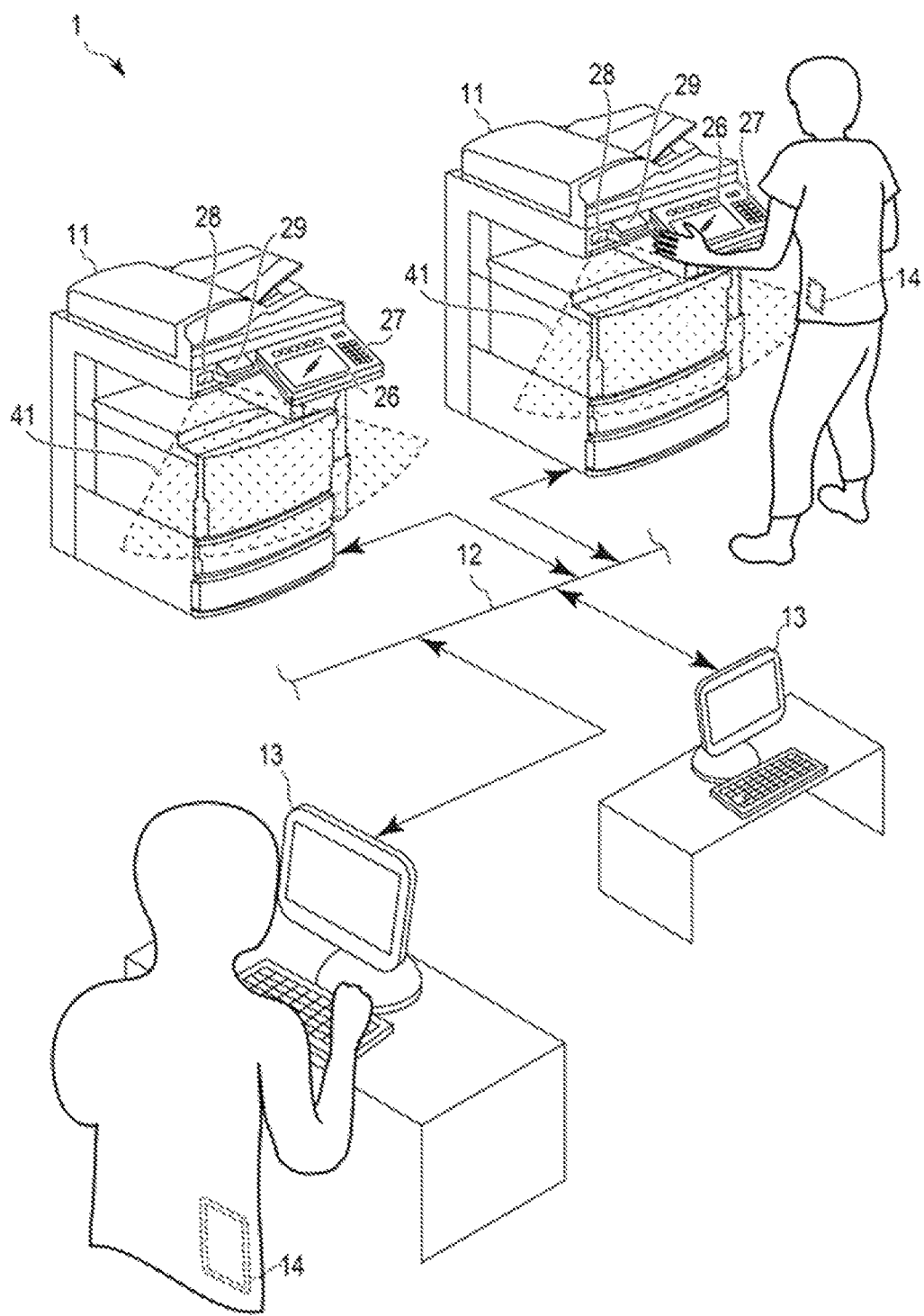
FIG. 1 depicts an image forming system according to an embodiment.

FIG. 1 is an explanatory diagram for explaining an example of the image forming system 1 according to one embodiment. As shown in FIG. 1, the image forming system 1 comprises a plurality of image forming apparatuses 11 to which a plurality information processing apparatuses 13 can be connected. The image forming apparatuses 11 are connected to each other via a network 12. The information processing apparatuses 13 are connected to the network 12 as a plurality of clients. The image forming apparatuses 11 and the information processing apparatuses 13 can communicate with each other via the network 12. Also, the plurality of image forming apparatuses 11 can communicate with each other via the network 12. In the present example, a user who operates one of the information processing apparatuses 13 additionally carries a portable terminal 14, which is capable of communicating with the image forming apparatuses 11 by, for example, wireless communication.

First, each configuration of the image forming system 1 will be described. Each of the information processing apparatuses 13 is a client apparatus configured to supply a print job to one or more of the image forming apparatuses 11. The information processing apparatus 13 is, for example, a personal computer (PC), a notebook PC, a smartphone, or a tablet PC.

According to one embodiment, the information processing apparatus 13 includes a display, an operation interface, a communication interface, and a system controller, which are not separately depicted.

The display of the information processing apparatus 13 is configured to show an image, etc. in accordance with an input video signal.

The operation interface has various operating elements. The operation interface supplies to the system controller an operation signal corresponding to the operation of the operation elements.

The communication interface is an interface for communicating with the image forming apparatus 11 via the network 12.

The system controller performs control of the information processing apparatus 11. The system controller comprises, for example, a processor and a memory.

The processor is an arithmetic element (for example, a CPU) for executing arithmetic processing.

The memory is a storage device for storing programs and data used in programs. The memory temporarily stores data or the like that is being processed by the processor. The memory is configured as a non-volatile memory.

The processor performs various processes based on data such as programs stored in the memory. For example, the processor generates a print job for causing the image forming apparatus 11 to perform printing and transmits the generated print job to the image forming apparatus 11.

The portable terminal 14 is a personal identification (or authentication) device, which is capable of connecting with the image forming apparatuses 11 by wireless communication. The portable terminal 14 is, for example, a mobile device such as an IC card, a smartphone, a tablet PC, or a wireless communication tag. For example, a user may carry an IC card capable of short-distance wireless communication.

The portable terminal 14 includes a communication interface and a system controller, which are not separately depicted.

The communication interface is an interface for communicating with the image forming apparatus 11 by wireless communication. The wireless communication may be, for example, a short-range wireless communication (ISO/IEC14443 or ISO/IEC18092), Wi-Fi®, Wi-Fi Direct®, Bluetooth Low Energy®, or the like. The communication method for wireless communication between the portable terminal 14 and the image forming apparatus 11 may be any other communication method.

Next, an example configuration of the image forming apparatus 11 according to one embodiment will be described. In the embodiment, the image forming apparatus 11 is a Multi-Function Printer (MFP) configured to perform various processes such as image formation while conveying a recording medium such as a printing medium (e.g., paper). For example, the image forming apparatus 11 is a solid-state scanning type printer such as an LED printer configured to scan an LED array for performing image formation on a printing medium. In another example, the image forming apparatus 11 may be an ink jet type printer, also referred to as an ink jet printer, that scans an ink jet head that ejects ink onto a recording medium. The image forming apparatus 11 is not limited to these examples and may be a printer of another type.

In one embodiment, the image forming apparatus 11 electrostatically charges a photosensitive drum and then selectively irradiates the photosensitive drum with light in a pattern corresponding to the image data to be printed. This selective irradiation forms an electrostatic latent image on the photosensitive drum. The image forming apparatus 11 then attaches toner to the latent image that has been formed on the photosensitive drum. The toner adhering to the latent image is then transferred to a printing medium to form a toner image on the printing medium. The image forming apparatus 11 then applies heat and pressure to the printing medium for fixing the toner image to the printing medium.

Figure 2:
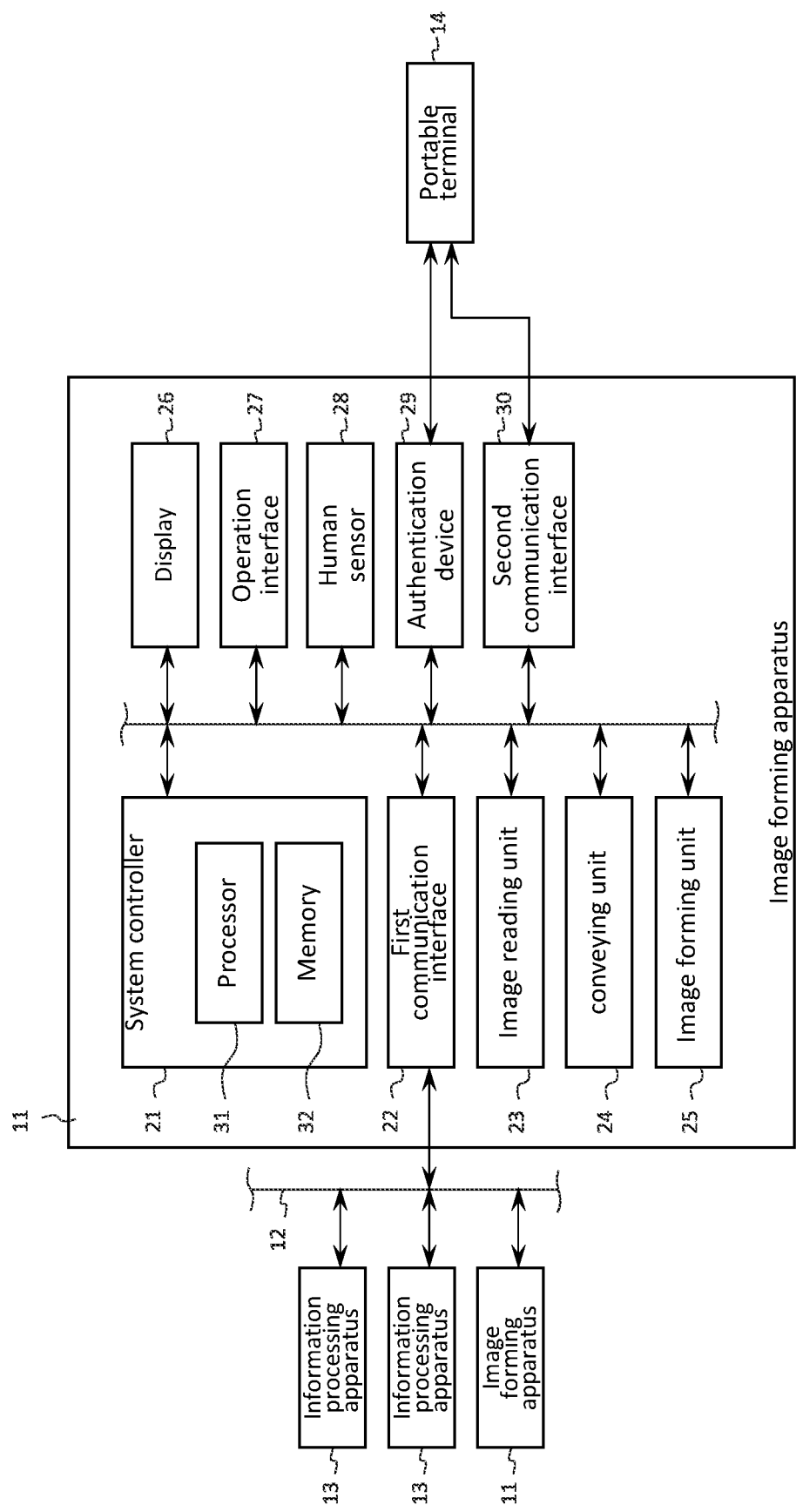
FIG. 2 depicts an image forming apparatus according to an embodiment.

FIG. 2 is a diagram for explaining an example of the configuration of the image forming apparatus 11 according to one embodiment. The image forming apparatus 11 includes a system controller 21, a first communication interface 22, an image reading unit 23, a conveying unit 24, an image forming unit 25, a display 26, an operation interface 27, a human sensor 28, an authentication device 29, and a second communication interface 30. The system controller 21, the first communication interface 22, the image reading unit 23, the conveying unit 24, the image forming unit 25, the display 26, the operation interface 27, the human sensor 28, the authentication device 29, and the second communication interface 30 can be accommodated in a separate housing or the like.

The system controller 21 controls the image forming apparatus 11. The system controller 21 includes, for example, a processor 31 and a memory 32.

The processor 31 is an arithmetic element (for example, a CPU) for executing arithmetic processing operations. The processor 31 in this example serves as a main component of the system controller 21. The processor 31 performs various operations on data or the like based on programs stored in the memory 32. By executing a program stored in the memory 32, the processor 31 functions as a control unit or controller that is capable of executing various operations according to program instructions.

The memory 32 is a storage device for storing programs and the data used in programs. The memory 32 temporarily stores data or the like being processed by the processor 31. The memory 32 is configured as a non-volatile memory.

The first communication interface 22 is an interface for communicating with the information processing apparatuses 13 and the other image forming apparatus 11 via the network 12.

The image reading unit 23 is configured to read an image from a document. The image reading unit 23 includes, for example, a scanner and an automatic document feeder (ADF). The scanner reads information/images on a document placed on a glass plate (platen) or the like. The scanner can be positioned opposite the glass plate to read the document from below or the like. In one embodiment, the image reading unit 23 acquires an image of a document by moving the scanner along the entire document. In another embodiment, the image reading unit 23 acquires an image of a document by passing the document through the scanner that is at a fixed scanner reading position.

The conveying unit 24 supplies a printing medium to the image forming unit 25, and then ultimately ejects the printed printing medium from the housing. The conveying unit 24 supplies a printing medium stored in a sheet cassette to the image forming unit 25 one sheet at a time. Further, the conveying unit 24 ejects the printing medium on which the image has been formed by the image forming unit 25 to a paper tray outside the housing.

The image forming unit 25 forms an image on the printing medium based on the control by the system controller 21. According to one embodiment, the image forming unit 25 includes a process unit, an exposure unit, a transfer mechanism, and a fixing device.

The process unit of the image forming unit 25 includes a photosensitive drum, a charger, and a developing device. The photosensitive drum is a photoreceptor having a cylindrical drum and a photosensitive layer formed on an outer peripheral surface of the drum. The photosensitive drum is rotated at a constant speed by a driving mechanism.

The charger uniformly charges the surface of the photosensitive drum. For example, the charger charges the photosensitive drum to a potential of a uniform negative polarity by applying a voltage to the photosensitive drum by using a charging roller.

The developing device is a device for adhering toner to the photosensitive drum. The developing device includes a developer container, an agitator mechanism, a developing roller, a doctor blade, and the like.

The developer container is a container for receiving and accommodating the toner from the toner cartridge. The developer container also contains careers in advance. The toner sent out from the toner cartridge is stirred with the carrier by the agitator mechanism to make a developer in which the toner and the carrier are mixed. The carrier is contained in the developer container at the time of manufacturing the developing device.

The developing roller rotates in the developer container to adhere the developer to a surface of the developing roller. The doctor blade is a member disposed at a predetermined interval from the surface of the developing roller. The doctor blade removes a portion of the developer adhered to the surface of the rotating developing roller. As a result, a layer of the developer having a thickness corresponding to the distance between the doctor blade and the surface of the developing roller is formed on the surface of the developing roller.

The exposure device of the image forming unit 25 according to one embodiment includes a plurality of light emitting elements. The exposure unit irradiates the photosensitive drum with light from the light emitting elements to form a latent image on the photosensitive drum. The light-emitting elements are, for example, Light-Emitting Diodes (LED) or the like. Each light-emitting element is configured to irradiate light to one corresponding point on the photosensitive drum. The plurality of light emitting elements are arranged in the main scanning direction which is parallel to the rotation axis of the photosensitive drum.

The exposure device irradiates light onto the photosensitive drum by the plurality of light emitting elements arranged in the main scanning direction to form the latent image for one line on the photosensitive drum. Furthermore, the exposure device continuously irradiates the photosensitive drum with light to form latent image of a plurality of lines.

In this example, when light is irradiated from the exposure device onto the surface of the photosensitive drum charged by the charger, an electrostatic latent image is formed. When the layer of developer formed on the surface of the developing roller is brought close to the surface of the photosensitive drum, toner contained in the developer adheres to the latent image formed on the surface of the photosensitive drum. As a result, a toner image forms on the surface of the photosensitive drum.

The transfer mechanism of the image forming unit 25 transfers the toner image formed on the surface of the photosensitive drum to the printing medium. In one embodiment, the transfer mechanism includes a first transfer belt, a second transfer roller, and a plurality of other rollers. The transfer mechanism receives a toner image formed on the surface of the photosensitive drum on the outer peripheral surface of the first transfer belt. The transfer mechanism conveys the toner image on the outer peripheral surface of the first transfer belt to a transfer nip in which the second transfer roller and the outer peripheral surface of the first transfer belt are in close contact with each other. The transfer mechanism transfers the toner image on the outer peripheral surface of the first transfer belt to the printing medium by passing the printing medium supplied by the conveying unit 24 to the transfer nip.

The fixing device of the image forming unit 25 fixes the toner image transferred to the printing medium onto the printing medium. In one embodiment, the fixing device includes a heating member (e.g., a heat roller) for applying heat to a printing medium, a pressing member (e.g., a press roller) for applying pressure to the printing medium, and a heater for heating the heat roller. The press roller forms a fixing nip, in which the press roller and the heat roller are brought into close contact with each other, by applying pressure to the heat roller. The fixing device applies heat and pressure to the printing medium by passing the printing medium, on which the toner image has been transferred by the transfer mechanism, into the fixing nip. Thereby, the fixing device fixes the toner image formed on the printing medium. The printing medium that has passed through the fixing nip is sent out to the paper tray by the conveying unit 24.

The display 26 of the image forming apparatus 11 shows images, texts, contents, or the like in accordance with a video signal input from a display control unit such as the system controller 21 or other graphics controller. For example, the display 26 shows images for various settings of the image forming apparatus 11.

The operation interface 27 has various operation members. The operation interface 27 supplies an operation signal corresponding to the operation of the operation member to the system controller 21. The operating member may be, for example, a touch sensor, a numeric keypad, a power key, a paper feed key, various function keys, or a keyboard. The touch sensor may be, for example, a resistive touch sensor, a capacitive touch sensor, or the like. The touch sensor acquires information indicating a position specified in a certain region. The touch sensor is configured as a touch panel integrally with the display 26 so that a signal indicating a touched position on the display 26 is input to the system controller 21.

The human sensor 28 is a sensor for detecting whether the user exists in the vicinity of the image forming apparatus 11. As shown in FIG. 1, the human sensor 28 detects presence/absence of a person in a predetermined detection range 41 in the vicinity of the housing of the image forming apparatus 11. The human sensor 28 supplies the detection result to the system controller 21. The human sensor 28 may be a reflection type sensor having, for example, a projector such as an LED for outputting light and a photodiode for detecting the reflected light of the light from the projector. Further, the human sensor 28 may be provided with a camera including an image sensor and an optical system for imaging light from the passage to the image sensor and may be configured to detect the nearby user by analyzing the image acquired by the camera.

The authentication device 29 is an interface for performing communication with the portable terminal 14 possessed by the user. For example, the authentication device 29 is an IC card reader that performs wireless communication with an IC card possessed by the user. The authentication device 29 communicates with the IC card by short-range wireless communication specified in, for example, ISO/IEC14443 or ISO/IEC18092.

The second communication interface 30 is an interface for performing communication with the portable terminal 14 possessed by the user. For example, the second communication interface 30 performs wireless communication with the portable terminal 14 possessed by the user in accordance with Wi-Fi®, Wi-Fi Direct®, Bluetooth Low Energy®, or other wireless communication scheme.

Next, an operation in the case where the image forming apparatus 11 receives a print job will be described. As described above, the information processing apparatus 13 generates a print job for causing the image forming apparatus 11 to perform printing and transmits the generated print job to one of the image forming apparatuses 11. When an executable print job is received, the processor 31 of the image forming apparatus 11 stores the received print job in the memory 32. When printing is executed based on the print job, the processor 31 deletes the print job from the memory 32.

FIG. 3 is an explanatory diagram for explaining an example of a print job according to one embodiment. The print job includes image data that indicates an image to be formed on a printing medium and various pieces of information as shown in FIG. 3. For example, the print job includes information such as a "user ID", a "computer name", a "job name", a "creation date and time", and a "number of prints".

The "user ID" is identification information assigned to each user of the information processing apparatus 13. When generating a print job, the information processing apparatus 13 adds the "user ID" associated with the logged-in user to the print job. The "user ID" is also stored in the portable terminal 14 possessed by the user.

The "computer name" is identification information for identifying the information processing apparatus 13 that has generated the print job.

The "job name" is information indicating a file used for generating a print job.

The "creation date and time" is information indicating the date and time when the information processing apparatus 13 has generated the print job.

The "number of prints" is information indicating the number of sheets to be printed by the image forming apparatus 11. The "number of prints" may include information such as the number of prints (or the number of pages or sheets) per copy and the number of sets (or the number of page sets). The "number of prints" may include information indicating the size of the printing medium for each page. The "number of prints" may include information indicating whether the color printing or the monochrome printing is performed.

When the print job is stored in the memory 32, the processor 31 of the image forming apparatus 11 calculates the expected process time based on the information of the "number of prints". The processor 31 adds the calculated expected process time to the print job.

Figure 4:
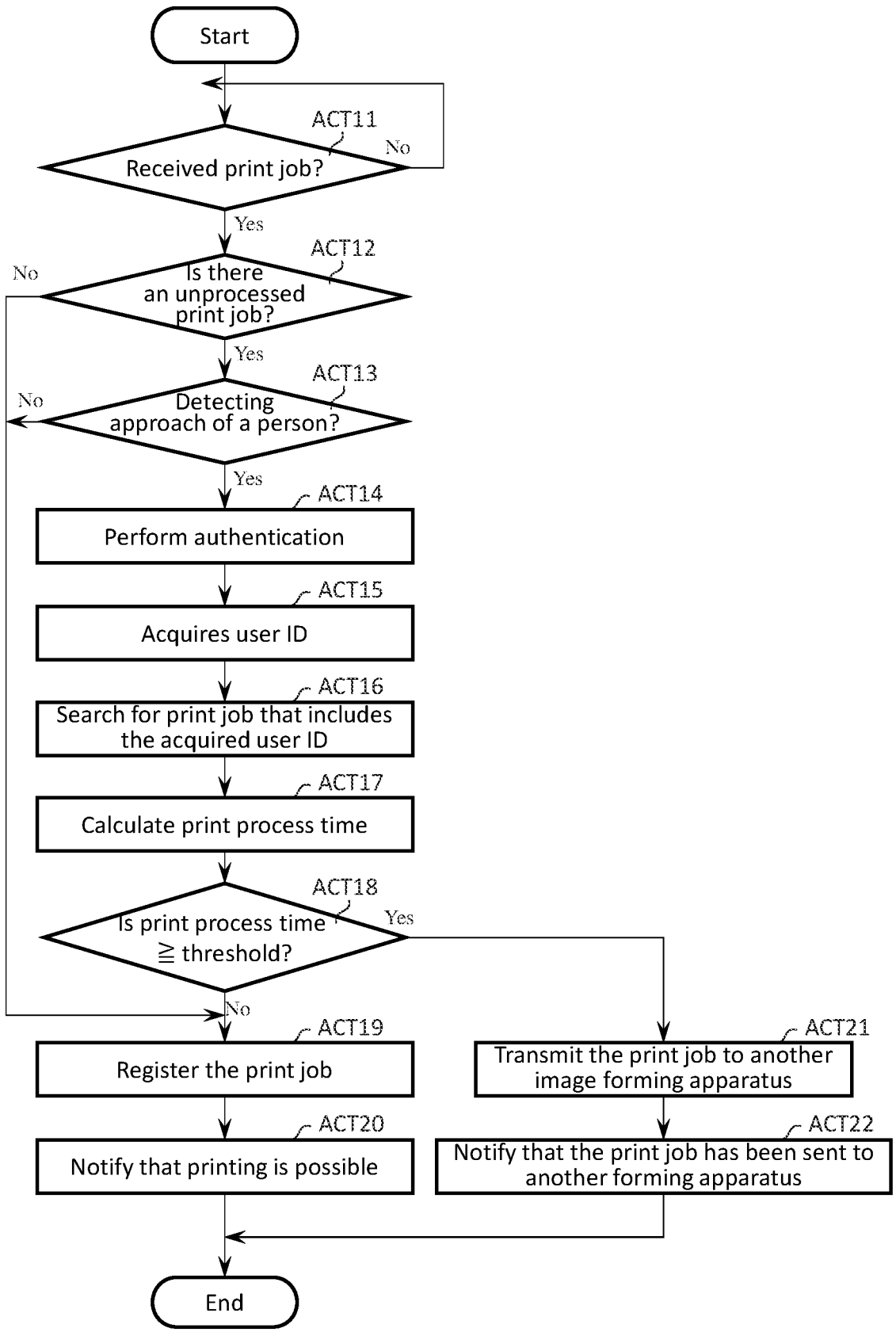
FIG. 4 depicts an example of an operation of an image forming apparatus according to an embodiment.

FIG. 4 is a flowchart for explaining an operation when the image forming apparatus 11 receives a print job according to one embodiment.

The processor 31 of the image forming apparatus 11 determines whether a print job has been received (ACT11). The processor 31 executes the process of ACT11 until the print job is received.

When it is determined that the print job has been received (ACT11, YES), the processor 31 determines whether there is an unprocessed print job stored in the memory 32 (ACT12). For clarification, such an unprocessed print job stored in the memory 32 is referred to as an already received print job as shown in FIG. 3. When the processor 31 determines that there is an unprocessed print job stored in the memory 32 (ACT12, NO), the process proceeds to ACT19.

When it is determined that there is an unprocessed print job, that is an already received print job, stored in the memory (ACT12, YES), the processor 31 determines whether approach of a person has been detected (ACT13). For example, when a person in the vicinity of the image forming apparatus 11 is detected by the human sensor 28, the processor 31 determines that the person has approached. When the processor 31 determines that the person has not approached (ACT13, NO), the process proceeds to ACT19.

When it is determined that the person has approached (ACT13, YES), the processor 31 executes authentication (ACT14). For example, upon the determination that the person has approached, the processor 31 activates the authentication device 29. The authentication device 29 becomes ready to communicate with the portable terminal 14 carried by the nearby user. In order to execute the printing by the image forming apparatus 11, the user holds the portable terminal 14, which is configured as an IC card in this example, over the reading range of the authentication device 29. The authentication device 29 performs the authentication of the IC card by performing a command response with the IC card.

The processor 31 acquires a "user ID" from the information acquired from the portable terminal 14 by the authentication device 29 (ACT15). That is, the processor 31 acquires the "user ID" stored in the portable terminal 14 possessed by the user in the vicinity of the image forming apparatus 11.

The processor 31 searches for a print job that includes the acquired "user ID" (ACT16) among the unprocessed print jobs or already received print jobs. That is, the processor 31 searches the memory 32 for the specific unprocessed print job transmitted from the information processing apparatus 13 used by the nearby user.

The processor 31 calculates a time required for printing the searched print job (hereinafter referred to as print process time) (Act17). In one embodiment, the processor 31 calculates the time required to execute the printing according to the searched print job. For example, when there is one unprocessed, already-received print job extracted by the search, the processor 31 recognizes the "expected process time" of the extracted print job as the print process time. As another example, when there are a plurality of print jobs extracted by the search, the processor 31 calculates the sum of the "expected process time" of the plurality of extracted print jobs as the print process time. The processor 31 may be configured to calculate the "expected process time" of each print job in ACT17, instead of calculating the "expected process time" in advance.

The processor 31 determines whether the calculated print process time is equal to or larger than a preset threshold (ACT18). When the processor 31 determines that the calculated print process time is less than the preset threshold (ACT18, NO), the process goes to ACT19.

The processor 31 then registers the newly received print job (ACT19). For example, the processor 31 stores the newly received print job in the memory 32.

When registering the newly received print job, the processor notifies the information processing apparatus 13 which transmitted the print job that the print job can be printed (ACT20) and ends the process in FIG. 4. For this purpose, in one embodiment, the image forming apparatus 11 has a table in which the "user ID" and the "notification destination" are associated with each other in the memory 32. The "notification destination" is, for example, a MAC address of the information processing apparatus 13. The "notification destination" may be information for transmitting information to the portable terminal 14 possessed by the user (for example, an e-mail address or an ID in a predetermined application). For example, the processor 31 specifies the "notification destination" based on the "user ID" of the newly received print job and notifies the specified "notification destination" that the print job is registered and that the print execution can be executed.

When the processor 31 determines that the calculated print process time is equal to or larger than the preset threshold (ACT18, YES), the process moves to ACT21.

In ACT21, the processor 31 transmits the newly received print job to another image forming apparatus 11 (or the second image forming apparatus among the plurality of image forming apparatuses) (ACT21). In one embodiment, the processor 31 may transmit the newly received print job to another image forming apparatus 11 that has been set in advance as a default alternative. For example, if the image forming apparatus 11 belongs to a predetermined group (such as a group of the image forming apparatuses on the same floor of a building), the newly received print job will be forwarded to another image forming apparatus 11 in that group. In another example, each image forming apparatus 11 may have a priority order associated with the "user ID" in advance, and the image forming apparatus 11 for the newly received print job (that is the first image forming apparatus) may specify the other image forming apparatus 11 (that is the second image forming apparatus) for forwarding of the received print job based on the priority order and then forward the newly received print job to the specified image forming apparatus 11 for printing.

When the newly received print job is forwarded to the other image forming apparatus 11, the processor 31 notifies the information processing apparatus 13, which transmitted the print job, that the print job has been forwarded to the other image forming apparatus 11 (ACT22). The processor 31 then ends the process of FIG. 4, and the process continues or restarts at the other image forming apparatus 11 (that is the second image forming apparatus). In this case, the processor 31 sends the notification to the other image information processing apparatus 13 by using the "notification destination" associated with the "user ID". Also, the processor 31 may notify the information processing apparatus 13, which transmitted the print job, of the information identifying the other image forming apparatus 11.

As described above, according to one embodiment, the image forming apparatus 11 includes the first communication interface 22, the image forming unit 25, and the processor 31. The first communication interface 22 is configured to communicate with the plurality of information processing apparatuses 13 and the other image forming apparatus 11 via the network 12. The image forming unit 25 executes printing based on one or more print jobs. When a print job is newly received by the first image forming apparatus 11, the processor 31 determines whether to execute printing based on the newly received print job by the image forming unit 25 or to transmit the newly received print job to another image forming apparatus 11 based on whether a person or a user of the system corresponding to the already received print job is present in the vicinity of the first image forming apparatus 11 or not.

In this manner, when a different user is present in the vicinity of the image forming apparatus 11 and is operating that image forming apparatus 11 to execute his or her print job supplied from another client, the image forming apparatus 11 can forward the unexecuted or unprocessed, newly received print job to the other image forming apparatus 11. Thus, it is possible to prevent the user who newly transmitted the print job from waiting until the process of the already received print job transmitted by the other user is complete.

Further, when the image forming apparatus 11 determines that a person corresponding to another print job is present in the vicinity and the execution of that job takes time, the image forming apparatus 11 may transmit the newly transmitted (or newly received) print job to the other image forming apparatus 11. That is, the image forming apparatus 11 may determine whether to transmit the newly received print job to the other image forming apparatus 11 based on the time required to process the unexecuted, newly transmitted print job. According to this configuration, it is possible to prevent the user who has newly transmitted the print job from waiting until the process of the already received print job requiring the long time transmitted by the other user is complete.

Although the portable terminal 14 has been described as being an IC card in the above embodiment, the present disclosure is not limited to this configuration. The portable terminal 14 may be configured as a smartphone, a tablet PC, or a wireless communication tag capable of wireless communication with the second communication interface 30 of the image forming apparatus 11 by a wireless communication method such as Wi-Fi®, Wi-Fi®, or Bluetooth Low Energy®.

In this case, the second communication interface 30 is configured to acquire a "user ID" from the portable terminal 14 that has entered the communication range, for example. When the "user ID" can be acquired from the portable terminal 14 by the second communication interface 30, the processor 31 can determine that a person is present in the vicinity of the image forming apparatus 11. In this example, the configuration of the human sensor 28, the authentication device 29, and the like can be omitted.

It should be noted that the functions described in the above embodiments may be implemented by reading a program describing each function by using software. Further, each function may be configured by selecting one of software and hardware. The program may be stored in a non-transitory computer readable medium.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
 a communication interface configured to communicate with a plurality of information processing apparatuses via a network and receive a plurality of print jobs transmitted from the information processing apparatuses;
 an image forming unit configured to execute printing according to a first print job of the plurality of print jobs; and
 a processor configured to:
 when the first print job from a first user is received via the network, determine a presence of a second user associated with a second print job of the plurality of print jobs, the second print job having been received via the network before the first print job, and
 select between executing the first print job and transmitting the first print job to another image forming apparatus based on the presence of the second user associated with the second print job.

2. The image forming apparatus according to claim 1, wherein the processor is further configured to transmit the first print job to the other image forming apparatus when the second user is determined to be present and execution of the second print job requires at least predetermined amount of time.

3. The image forming apparatus according to claim 1, wherein the processor is further configured to:
 calculate print process time of the second print job;
 determine whether the calculated print process time is equal to or greater than a threshold, and
 execute the first print job if the calculated print process time of the second print job is less than the threshold and transmit the first print job to the other image forming apparatus if the calculated print process time of the second print job is equal to or greater than the threshold.

4. The image forming apparatus according to claim 1, further comprising:
 an information acquisition unit configured to acquire user identification information from a portable terminal.

5. The image forming apparatus according to claim 4, wherein the processor is further configured to determine that the second user is present when user identification information acquired by the information acquisition unit matches user identification information included in the second print job.

6. The image forming apparatus according to claim 1, further comprising:

a sensor configured to detect a presence of users in the vicinity of the image forming apparatus.

7. The image forming apparatus according to claim 6, wherein, when the sensor detects a user in the vicinity of the image forming apparatus, the processor is configured to control an information acquisition unit to acquire user identification information from the detected user and to perform user authentication using the acquired user identification information.

8. The image forming apparatus according to claim 1, wherein the processor is further configured to send a notification to an information processing apparatus that the first print job has been transmitted to the other image forming apparatus.

9. An image forming system, comprising:
a plurality of image forming apparatuses, each configured to execute printing based on print jobs from a plurality of information processing apparatuses, wherein
a first image forming apparatus of the plurality of image forming apparatuses comprises:
 a communication interface configured to communicate with the plurality of information processing apparatuses via a network and receive a plurality of print jobs transmitted from the information processing apparatuses;
 an image forming unit configured to execute printing according to a first print job of the plurality of print jobs; and
 a processor configured to:
  if the first print job has been received via the network, detect a presence of a user associated with a second print job of the plurality of print jobs in the vicinity of the first image forming apparatus, the second print job having been received via the network before the first print job; and
  select between executing the first print job and transmitting the first print job to a second image forming apparatus of the plurality of image forming apparatuses based on the presence of the user associated with the second print job.

10. The image forming system according to claim 9, wherein the processor is further configured to transmit the first print job to the other image forming apparatus when the user is determined to be present and execution of the second print job requires at least predetermined amount of time.

11. The image forming system according to claim 9, wherein the processor is further configured to:
calculate print process time of the second print job;
determine whether the calculated print process time is equal to or greater than a threshold; and
execute the first print job if the calculated print process time of the second print job is less than the threshold and transmit the first print job to the other image forming apparatus if the calculated print process time of the second print job is equal to or greater than the threshold.

12. The image forming system according to claim 9, wherein the first image processing apparatus further comprises an information acquisition unit configured to acquire user identification information from a portable terminal.

13. The image forming system according to claim 9, wherein
the first image forming apparatus further comprises a sensor configured to detect a presence of users in the vicinity of the first image forming apparatus, and
when the sensor detects a user in the vicinity of the first image forming apparatus, the processor is configured to control an information acquisition unit to acquire user identification information from the detected user and to perform user authentication using the acquired user identification information.

14. The image forming system according to claim 9, wherein the processor of the first image forming apparatus is further configured to send a notification to a first information processing apparatus that the first print job has been transmitted to the second image forming apparatus.

15. A method for controlling a plurality of image forming apparatuses, each configured to receive a plurality of print jobs from information processing apparatuses and execute printing based on at least one of the plurality of print jobs, the method comprising:
receiving a first print job from a first user at a first image forming apparatus of the plurality of image forming apparatuses via a network;
determining whether a second user associated with a second print job is present in the vicinity of the first image forming apparatus, the second print job having been received via the network before the first print job; and
selecting between executing the first print job on the first image forming apparatus or forwarding the first print job to a second image forming apparatus of the plurality of image forming apparatuses based on the presence of the second user associated with the second print job.

16. The method according to claim 15, further comprising:
forwarding the first print job to the second image forming apparatus if the second user is near the first image forming apparatus and execution of the second print job requires at least a predetermined amount of time.

17. The method according to claim 15, further comprising:
calculating print process time of the second print job;
determining whether the calculated print process time is equal to or greater than a threshold; and
executing the first print job if the calculated print process time is less than the threshold and forwarding the first print job to the second image forming apparatus if the calculated print process time is equal to or greater than the threshold.

18. The method according to claim 15, further comprising:
acquiring user identification information from a portable terminal being carried by a user; and
determining that the second user associated with the second print job is near the first image forming apparatus if user identification information acquired by the information acquisition unit matches user identification information included in the second print job.

19. The method according to claim 18, further comprising:
detecting a presence of a user near the first image forming apparatus using a sensor of the first image forming apparatus; and
performing authentication by acquiring the user identification information from the portable terminal when the presence of the user is detected near the first image forming apparatus.

20. The method according to claim 15, further comprising:
sending a notification to an information processing apparatus that the first print job has been forwarded to the second image forming apparatus.

* * * * *